Jan. 24, 1950        W. O. LUM        2,495,227
CONDITION RESPONSIVE REVERSING VALVE MECHANISM
Filed Feb. 19, 1947
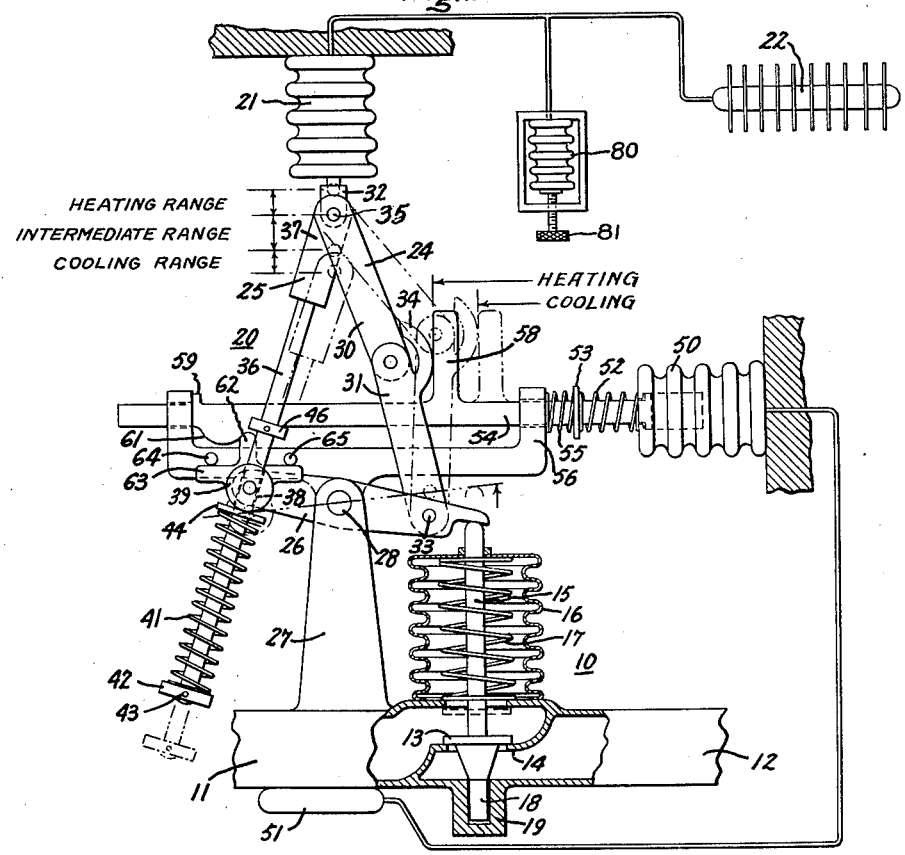
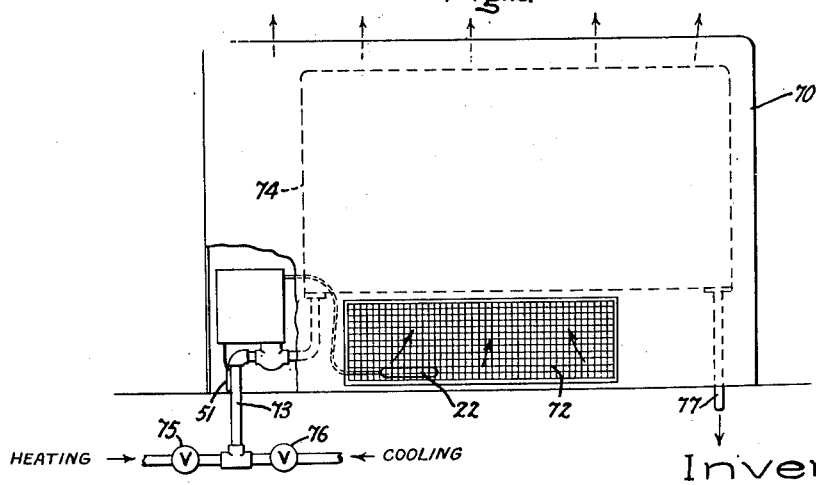
Inventor:
Walter O. Lum,
by Edwin L. Rich
His Attorney.

Patented Jan. 24, 1950

2,495,227

UNITED STATES PATENT OFFICE 2,495,227

CONDITION RESPONSIVE REVERSING VALVE MECHANISM

Walter O. Lum, Livingston, N. J., assignor to General Electric Company, a corporation of New York Application February 19, 1947, Serial No. 729,606

13 Claims. (Cl. 236—1)

1

The invention relates to improvements in automatic valves of the type providing complementary condition responsive reversible flow regulation. These improvements are particularly useful in a thermostatic valve suitable for alternatively and reversely regulating the flow of heating or cooling medium such as hot or cold water to a room air conditioning unit under the control of a pair of thermostatic devices respectively responsive to the room temperature and the medium temperature. As disclosed and claimed in the Crago Patent 2,121,625, such an automatic valve has the unique characteristics of increasing the flow of heating medium but decreasing the flow of cooling medium upon a decrease in room temperature and vice versa.

One object is to provide an improved form of complementary condition responsive alternative reverse motion mechanism for reversely actuating the valve under alternative conditions.

Another object is to provide an improved complementary condition responsive alternative reverse motion mechanism that will automatically shift the control range of the valve upon reversal of the flow regulation. Thus in a heating and cooling thermostatic valve of the character indicated above, the heating control range of the valve may be separate from and lower than the cooling control range.

Another object is to provide for automatically opening the valve a limited amount under intermediate stand-by conditions so as to prevent any abnormal shift from one flow regulating range to the reverse flow regulating range. In a heating and cooling control valve this provides a limited flow of the medium through the valve when neither heating or cooling is required or when the temperature of the fluid medium is in an intermediate range so as to insure proper response of the medium temperature responsive device that controls the reversing of the valve flow regulating action.

Further objects and advantages of the present invention will appear in the following description of the accompanying drawing in which Fig. 1 is a front view, partly in section, of an improved form of automatic complementary thermomotive reversing valve mechanism embodying the improvements of the present invention in a preferred form and Fig. 2 is a front view partly in section of a room temperature controlling reversible heat exchanger unit that may be supplied with either heating or cooling medium such as hot or cold water under the automatic control of the improved flow regulating valve of Fig. 1.

2

The improved automatic reversing valve is indicated collectively by the reference character 10 and variably restricts the flow between the inlet side 11 and the outlet side 12 of the valve upon reverse movements of the valve closure member 13 towards or away from the seat 14. As shown the reversely movable valve member 13 is provided with an operating stem 15 sealed to the top of the flexible sealing bellows 16 with the spring 17 enclosed within the bellows to bias the valve 13 to the open position. A guide stem 18 sliding in a suitable guide formed in valve casing 19 serves to maintain movable valve 13 in proper operating alignment with the seat 14.

The improved alternative motion reversing mechanism indicated generally by the reference character 20 enables a main thermomotive device in the form of an actuating bellows 21, having an interconnected bulb 22 adapted to be responsive to a temperature condition controlled by operation of the valve 13 to reversely actuate the valve 13 with respect to variations in such temperature condition.

For this purpose a pair of alternative operating lost motion connections 24 and 25 are connected to the opposite ends of the centrally pivoted valve operating lever 26 that is pivotally mounted on a supporting arm 27 by means of the pivot pin 28. In the preferred form shown, the lost motion connection 24 is formed by the toggle links 30 and 31 with link 30 pivotally connected to the movable end of the bellows 21 by means of the pivot block 32 and the links 31 pivotally connected with the right hand end of lever 26 by means of pivot pin 33. The pivot link 31 is provided with a suitable stop 34 that serves to limit the straightening of the toggle links 30 and 31 so that they remain slightly out of endwise alignment to insure ready collapse of the toggle whenever movement of the central pivot knee thereof to the right is unrestrained.

The alternative lost motion operating connection 25 comprises the rod 36 having the clevis yoke 37 at the upper end thereof pivotally connected with the movable end of bellows 21 by means of the pivot mounting block 32 and pivot pin 35. The rod 36 slides through a suitable opening 38 formed in the cylindrical spacer block 39 that is rotatably mounted upon the left hand end of the valve operating lever 26. A biasing spring 41 surrounds the lower end of rod 36 and extends between the collar 42 that is fixed to the lower end of rod 36 by means of pin 43 and the upper sliding collar or washer 44 that engages with the lower side of spacer block 39. The rod 36 also carries an actuating collar 46 for engaging with the upper side of the spacer block 39 when the toggle links 30 and 31 are collapsed and bellows 21 has expanded sufficiently to move the actuating collar 46 downwardly into engagement with the spacer block 39.

Thus provision is made for equalized lost motion of the alternative actuating connections 24 and 25 so as to enable bellows 21 to reversely operate the centrally pivoted tilting lever 26 that in turn operates valve 13 substantially equal distances in opposite directions. When the toggle links 30 and 31 are held in a straightened position then the expansion and contraction of bellows 21 is transmitted through the toggle links to correspondingly lower and raise the right hand end of lever 26 and thus valve 13. However, when toggle links 30 and 31 are collapsed so as to provide lost motion thereof, then the expansion and contraction of bellows 21 is transmitted through rod 36 with actuating collar 46 held in engagement with the upper side of spacer block 39 by the compressive force of spring 41 so as to lower and raise the left hand end of the tilting lever 26 and thus reversely operate valve 13 substantially equal distances for equal changes in temperature.

In this way bellows 21 can operate through the toggle links 30 and 31 to open and close valve 13 upon variation of the temperature of bulb 22 in a heating temperature control range. But when toggle links 30 and 31 are collapsed bellows 21 then operate through rod 36 to reversely open and close valve 13 upon similar variation of the temperature of bulb 22 in a cooling temperature control range. The alternative lost motion operating connection mechanism of the present invention enables the cooling temperature range to be separated from and higher than the heating temperature control range as indicated in Fig. 1.

The reversal of the flow regulation of valve 13 is controlled by a thermomotive device in the form of bellows 50 provided with a bulb 51 located in heat transfer relation with the medium controlled by valve, preferably being located in contact with the inlet 11 of the valve as shown. The thermomotive device 50 alternatively controls the lost motion in the alternative lost motion operating connections 24 and 25. For this purpose bellows 50 operate upon expansion thereof through the relative stiff over-temperature protective spring 52 to move the collar 53 that is fixedly secured to the push rod 54. The opposing biasing spring 55 serves to bias collar 53 and hence push rod 54 to the right upon contraction of bellows 50. Push rod 54 slides in suitable bearings provided in bracket 56 that may extend from the top of the mounting arm 27 as shown.

The push rod 54 carries a finger 58 for engaging with the arcuate stop 34 of the toggle links so as to straighten these toggle links and maintain them in the straightened position whenever finger 58 is moved to the left into the position in which it is shown due to the expansion of bellows 50 upon response of bulb 51 to the temperature of heating medium (for example 100° F. or above) supplied to be controlled by valve 13. Push rod 54 is provided with a stop 59 for limiting the movement of finger 58 to the operative position in which it is shown.

Push rod 54 also is provided with a cam 61 for engaging with the finger 62 carried by the rocker arm 63 that is pivotally mounted on the left hand end of the tilting lever 26. This rocker arm co- operates with each of the spaced apart stop pins 64 and 65 mounted on bracket 56 so as to insure a slight opening of valve 13 under intermediate standby conditions (for example between 100° F. and 70° temperature of the medium) when the valve mechanism is not operating in either the heating control range or the cooling control range as will be more fully described hereinafter.

As shown in Fig. 2, the improved automatic reversing valve mechanism 10 shown in Fig. 1 may be applied to control the flow of heating or cooling medium to a room air conditioning unit 70. In such service, the temperature responsive bulb 22 of the main thermomotive bellows 21, may be located to respond to the temperature of the room air flow to the unit through the inlet opening 72. The bulb 51 of the reversing control thermomotive bellows 50 may be located to be responsive to the temperature of the medium supplied through the pipe 73 to the heat transfer surface 72 inside the unit with the valve 10 regulating the flow. As shown heating medium is supplied at a relatively high temperature when the valve 75 is opened while cooling medium is supplied at a relatively low temperature when the valve 76 is opened and the medium is returned to the medium heating or cooling apparatus through the return line 77.

Heating operation

With the improved valve mechanism of Fig. 1 applied as shown in Fig. 2, the heating control operation is as follows: The reversal control bellows 50 is shown expanded due to the response of bulb 51 to relatively high temperature for example 100° F. and above of the heating medium supplied to the room air conditioning unit 70. As a result finger 58 has been moved to straighten the toggle links 30 and 31. With the toggle links 30 and 31 thus straightened, the right hand end of the tilting lever 26 is in engagement with the upper end of the valve operating stem 15 so as to move the valve 13 to close the port 14, thus stopping the flow of heating medium to the heat transfer surface 74 of the room air conditioning unit. This indicates that the room air temperature to which bulb 22 responds has been increased sufficiently for bellows 21 to move pin 35, which is taken simply as a convenient reference point, to the upper temperature limit of the heating control range indicated in Fig. 1.

When bulb 22 cools, then the bellows 21 contracts and operates through toggle links 30 and 31 to raise the right hand end of tilting lever 26. This permits spring 17 to expand bellows 16 and thereby open valve 13 with the top of the valve stem 15 following the movement of lever 26. The opening of valve 13 permits heating medium to flow to the air conditioning unit thereby supplying heat to offset the heat loss that produced the drop in temperature of bulb 22. In case the temperature bulb 22 should continue to drop, then bellows 21 continues to contract and the opening movement of valve 13 is continued until the valve is fully open to permit full flow of heating medium to the air conditioning unit.

When the temperature of bulb 22 increases, then bellows 21 expands to correspondingly operate through toggle links 30 and 31 to lower the right hand end of pivoted lever 26 and thereby move valve 13 towards the closed position. In this way the valve is operated so as to regulate the heating medium flow to offset the heat lost as required by the varying load of the air condition unit 70.

If during heating operation valve 13 becomes closed, then the flow of heating medium is stopped and the temperature of the medium adjacent valve 13 may decrease as for example below 100° F. due to heat radiation and convection from the supply pipe sufficiently to cause bellows 50 to contract. In such a case the contraction of bellows 50 will permit biasing spring 53 to move push rod 54 to the right. The resulting engagement of cam 61 with finger 62 tilts rocker arm 63 about stop 64 as a fulcrum. Since rocker arm 63 is pivotally mounted on the left hand end of tilting lever 26, this end of the lever will be moved downwardly and the right hand end will be moved upwardly so as to effect a slight opening of valve 13. As a result flow of the heating medium is reestablished so as to maintain bulb 51 properly responsive to the high temperature of the medium. With the flow of heating medium reestablished bellows 50 will again expand and in this way automatically maintain finger 58 in proper operating relation with the arcuate stop 34 of the toggle link.

Cooling operation

For cooling operation, cooling medium normally below 70° F. will be supplied to valve 10 and bulb 51 will respond to the lower temperature of the cooling medium to contract bellows 50 and thereby effect movement of push rod 54 to the right. This removes finger 58 from engagement with arcuate stop 34 and permits the collapse of toggle links 30, 31, and cam 61 engages finger 62 to open valve 13 against bias 41 until rod 54 has reached extreme right hand position. However, spring 41 biases tilting lever 26 to return valve 13 closed until the temperature of bulb 22 rises into the cooling temperature control range. When this occurs, bellows 21 will be expanded sufficiently to move pivot 35, the assumed reference point, out of the heating range and through the intermediate range into the cooling range as indicated schematically in Fig. 1. The location of collar 46 on rod 36 is so fixed that when the assumed reference point, formed by a pivot 35, reaches the lower limit of the cooling range, then collar 46 engages with the upper side of spacer block 39. Upon any further increase in temperature of bulb 22, the resulting expansion of bellows 21 will be transmitted through rod 36 and collar 46 to tilt lever 26 and thereby open valve 13 to admit cooling medium to the air conditioning unit. In case the temperature of bulb 22 continues to increase, valve 13 will be further opened until the full open position is reached to permit the maximum flow of cooling medium to the heat transfer surface 74 of the room air conditioning unit 70.

When the room cooling load decreases, then the air conditioning unit will lower the room air temperature sufficiently to decrease the temperature of bulb 22. As a result bellows 21 will contract and rod 36, together with the collar 46, will be raised so as to move valve 13 towards the closed position. In this way the position of valve 13 is regulated so as to permit a sufficient flow of cooling medium to the air conditioning unit to balance the cooling load. During cooling operation valve 13 is moved toward the closed position upon a decrease in temperature of bulb 22 while during heating operation valve 13 is moved towards the open position upon a decrease in temperature of bulb 22 and vice versa.

If during cooling operation, the cooling load should decrease to the point where valve 13 becomes closed, then the temperature of the cooling medium in the inlet 11 of valve may increase above 70° F. due to heat absorption sufficiently to cause bulb 51 to reach a temperature where bellows 50 expands. In such a case push rod 54 will be moved to the left so as to engage cam 61 with finger 62 and thereby tilt rocker arm 63 about pivot pin 65 as a fulcrum. Such tilting of rocker arm 63 will lower the left hand end of lever 26 and correspondingly raise the right hand end to slightly open valve 13. In this way a slight flow of cooling medium is reestablished so as to cause bulb 51 to respond to the normally low temperature thereof and thereby maintain the reversing valve operating mechanism properly positioned for the cooling phase of operation.

It will be understood that a suitable calibrating bellows 80 with manual adjusting element 81 therefor may be provided for adjusting both the heating range and cooling range of control as desired.

What I claim as new and desire to secure by Letters Patent of the United States, is:

1. In combination, a valve for controlling the flow of a variable temperature medium, said valve having a centrally pivoted operating lever, a thermomotive device having alternative lost motion operating connections with the opposite ends of said lever for reversely moving said valve in accordance with variations in a temperature condition in separate ranges, one of said lost motion connections slidably engaging one end of said lever and having a stop for limiting the sliding movement thereof and a spring for biasing said one end toward said stop, the other of said lost motion connections engaging the other end of said lever and being arranged to force said lever away from said stop in one position and to release said lever for engagement with said stop in its other position, said one connection being effective to actuate said valve when said stop is in engagement with said lever, and said other connection being effective to actuate said valve when in said one position, and a thermomotive device for rendering each of said operating connections selectively effective in response to predetermined variations in the temperature of said medium.

2. In combination, means including a reversely movable flow regulating valve for controlling a first variable condition dependent upon another condition, automatic actuating means responsive to said first condition for moving said valve in accordance with variations in said first condition, said automatic means including alternative connections for actuating the said valve, said connections being arranged for effecting opposite movements of said valve with respect to said variations in separate ranges, second automatic actuating means for alternatively rendering said connections effective upon variation in said other condition from one range to another range, and means operated by said second automatic actuating means for opening said valve to provide a predetermined minimum flow only when said other condition is intermediate said ranges.

3. In combination, a valve for controlling the flow of a variable temperature medium under reverse heat transfer conditions, a first thermomotive means for moving said valve in accordance with variations in a temperature condition dependent upon the temperature of said medium, said means including alternative connections for actuating said valve, said connections being arranged for effecting opposite movements of said valve with respect to said variations in separate temperature control ranges, a second thermomotive means for alternatively rendering said connections effective upon variation in the temperature of said medium from one range to another range, and means operated by said second thermomotive means for opening said valve to provide a predetermined minimum flow only when the temperature of said medium is between said ranges.

4. In combination, a valve for controlling the flow of a variable temperature medium having separate heating and cooling temperature ranges, first thermomotive control means including alternative operating connections for actuating said valve, one of said connections including a toggle for operating said valve in a heating temperature control range upon straightening of said toggle and the other of said connections including a lost motion linkage for effecting opposite operation of said valve in a cooling temperature control range above said heating temperature control range, said linkage including a spring for biasing said valve closed when said toggle is unstraightened and means operated by said thermomotive control means for opposing the bias of said spring to open said valve in said cooling temperature control range, a second thermomotive means responsive to variations in the temperature of said medium into and out of said heating temperature range for respectively straightening and unstraightening said toggle, and means operated by said second thermomotive means for effecting a limited opening of said valve against the bias of said spring when the temperature of said medium is between said heating and cooling temperature ranges.

5. In combination, an alternative heating and cooling control device having a flow passage, a valve for variably restricting said passage to control the flow of heating and cooling medium therethrough, biasing spring means normally biasing said valve to open said passage, operating mechanism for said valve including a thermomotive device responsive to variations in a temperature condition controlled by the flow of said mediums and provided with alternative connections for moving said valve to restrict said passage upon unlike variations in said condition, each of said connections having a lost motion position and a valve actuating position, and means including a second thermomotive device responsive to the temperature of said mediums and provided with connections for selectively rendering effective the actuating position of one connection and the lost motion position of the other and vice versa in response to the respective normal temperatures of said heating and cooling mediums to insure the opening of said valve by said biasing spring means when the temperature of either medium varies substantially towards the normal temperature of the other.

6. In combination, an alternative heating and cooling control device having a flow passage, a valve for variably restricting said passage to control the flow of heating and cooling medium therethrough, biasing spring means normally biasing said valve to open said passage, a lever pivoted for moving said valve to restrict said passage, a thermomotive device responsive to variations in a temperature condition controlled by the flow of said mediums and provided with alternative connections for oppositely tilting said lever upon like variations in said condition, each of said connections having a lost motion position and a valve actuating position, and means including a second thermomotive device responsive to the temperature of said mediums and provided with connections for selectively rendering effective the actuating position of one connection and the lost motion position of the other and vice versa in response to the respective normal temperatures of said heating and cooling mediums to insure the opening of said valve by said biasing spring means when the temperature of either medium varies substantially towards the normal temperature of the other.

7. An automatic reversible heating and cooling control valve having in combination flow regulating means including a valve member movable between closed and open positions for regulating the flow of both heating and cooling mediums, automatic mechanism for operating said valve member including a thermomotive element responsive to variations in a temperature condition controlled by the flow of said mediums and provided with alternative connections for oppositely moving said valve member between said positions upon like variations in said condition, each of said connections having a lost motion position and a valve actuating position, and means including a second thermomotive element responsive to the temperature of said heating and cooling mediums and provided with cooperating connections selectively rendering effective the actuating position of one connection and the lost motion position of the other and vice versa in response to the normal temperature of a corresponding one of said mediums, and said mechanism including biasing spring means under control of said elements for moving said valve member from closed position to open position when the temperature of either medium varies substantially toward the normal temperature of the other.

8. An automatic heating and cooling control valve having in combination flow regulating means including a valve member movable between closed and open positions for controlling the flow of both heating and cooling mediums, biasing spring means normally biasing said valve member to open position, operating mechanism for said valve member including a thermomotive element responsive to variations in a temperature condition controlled by flow of said mediums and provided with selective valve actuating mechanisms for moving said valve member towards the closed position upon unlike variations in said condition, each of said mechanisms having a lost motion position and a valve actuating position, one of said mechanisms having an operating spring for predominating over said valve biasing spring to close said valve member under control of said element upon a predetermined variation in said condition, and means including a second thermomotive element responsive to variation in temperature of said heating and cooling mediums and provided with connections for selectively rendering effective the actuating position of one mechanism and the lost motion position of the other and vice versa in response to the respective normal temperatures of said heating and cooling mediums, and connections under control of said second element for rendering said operating spring ineffective when the temperature of either medium varies substantially towards the normal temperature of the other.

9. In combination, means including a reversely movable flow regulating valve for controlling a first variable condition dependent upon a second variable condition, actuating means including a device responsive to said first condition for moving said valve in accordance with variations therein, said actuating means including a pivoted member engaging said valve and lost motion connections between said device and said member on opposite sides of the pivot of said member, one of said connections comprising a toggle arranged to be moved between a straightened position and a bent position to provide a direct connection between said device and said member in said straightened position and to be ineffective to move said member in said bent position, the other of said lost motion connections including means effective in the bent position of said toggle for providing a direct connection between said device and said member, and means responsive to said second condition for moving said toggle selectively between said straightened and bent positions.

10. In combination, means including a reversely movable flow regulating valve for controlling a first variable condition dependent upon a second variable condition, actuating means including a device responsive to said first condition for moving said valve in accordance with variations therein, said actuating means including a pivoted member engaging said valve and lost motion connections between said device and said member on opposite sides of the pivot of said member, one of said connections comprising a toggle arranged to be moved between a straightened position and a bent position to provide a direct connection between said device and said member in said straightened position and to be ineffective to move said member in said bent position, the other of said lost motion connections including means effective in the bent position of said toggle for providing a direct connection between said device and said member, and means cooperating with said last-mentioned means for maintaining said valve open a predetermined limited amount during movement of said toggle between its bent and straightened positions.

11. In combination, means including a reversely movable flow regulating valve for controlling a first variable condition dependent upon a second variable condition, a spring arranged to bias said valve normally to an open position, actuating means including a device responsive to said first condition for moving said valve in accordance with variations therein, said actuating means including a pivoted member engaging said valve and lost motion connections between said device and said member on opposite sides of the pivot of said member, one of said connections comprising a toggle arranged to be moved between a straightened position and a bent position to provide a direct connection between said device and said member in said straightened position and to be ineffective to move said member in said bent position, said biasing spring tending to bend said toggle, the other of said lost motion connections including means effective in the bent position of said toggle for providing a direct connection between said device and said member, and means responsive to said second condition for engaging the toggle adjacent the knuckle thereof to move said toggle selectively between said straightened and bent positions.

12. In combination, means including a reversely movable flow regulating valve for controlling a first variable condition dependent upon a second variable condition, actuating means including a device responsive to said first condition for moving said valve in accordance with variations therein, said actuating means including a pivoted lever engaging said valve and lost motion connections between said device and said lever on opposite sides of the pivot of said lever, one of said connections comprising a toggle arranged to be moved between a straightened position and a bent position to provide a direct connection between said device and said lever in said straightened position and to be ineffective to move said lever in said bent position, the other of said lost motion connections including means effective in the bent position of said toggle for providing a direct connection between said device and said lever, means including a member arranged to engage said toggle and responsive to said second condition for moving said toggle selectively between said straightened and bent positions, and means including a portion of said member for moving said lever to open said valve when said toggle is intermediate said positions.

13. In combination, means including a reversely movable flow regulating valve for controlling a first variable condition dependent upon a second variable condition, actuating means including a device responsive to said first condition for moving said valve in accordance with variations therein, said actuating means including a pivoted member mounted on a support attached to one side of said valve for engaging said valve and lost motion connections between said device and said member on opposite sides of the pivot of said member, one of said connections comprising a toggle arranged to be moved between a straightened position and a bent position to provide a direct connection between said device and said member in said straightened position and to be ineffective to move said member in said bent position, the other of said lost motion connections including means effective in the bent position of said toggle for providing a direct connection between said device and said member, and means responsive to said second condition for positioning said toggle and for moving said valve to an open position upon predetermined variations in said second conditions, said means including a pivoted rocker pivoted on one end of said pivoted member, a first and second pin attached to said support, a bar movably mounted on said support and having a first element for engaging the knuckle of said toggle to position the toggle in accordance with variations in said second condition, and a second element for engaging said rocker upon predetermined variation in said second condition to move said rocker about one of said pins, thereby moving the pivoted member to open said valve.

WALTER O. LUM.

REFERENCES CITED

The following references are of record in the file of this patent:

UNITED STATES PATENTS

| Number | Name | Date |
|---|---|---|
| 2,285,513 | Harris | June 9, 1942 |
| 2,310,293 | Joesting | Feb. 9, 1943 |